United States Patent [19]

Wade

[11] 4,205,733
[45] Jun. 3, 1980

[54] PORTABLE ELEVATED STATION

[76] Inventor: Elman E. Wade, R.D. #1, Box 21A, Ruffsdale, Pa. 15679

[21] Appl. No.: 713,131

[22] Filed: Aug. 10, 1976

[51] Int. Cl.² .......................... A45F 3/26; A47C 9/10
[52] U.S. Cl. .................................... 182/142; 182/187
[58] Field of Search ............... 182/187, 142; 254/157, 254/159, 174; 242/86.7, 99, 96

[56] References Cited

U.S. PATENT DOCUMENTS

| 305,100 | 9/1884 | Moore | 182/187 |
| 1,554,323 | 9/1925 | Bauerle | 242/99 |
| 3,731,762 | 5/1973 | Sirl | 182/142 |
| 3,814,345 | 6/1974 | Kropelnicki | 242/99 |
| 3,957,135 | 5/1976 | Lane | 182/142 |

Primary Examiner—Reinaldo P. Machado
Attorney, Agent, or Firm—Hymen Diamond

[57] ABSTRACT

A portable elevated station to be mounted on a tree, including a platform suspended from a hoist. The hoist includes a drum rotatable by handles. The hoist and platform are suspended from a bough of the tree by a rope which is connected to the tree at one end and to the drum near the other end. The drum is rotated by the operator on the platform, to wind or unwind the rope and raise or lower the platform, by the handles. The handles are at an angle of about 90 degrees to each other. There is then, in all angular and elevated positions of the drum, one or more handles available which can be pulled downwardly to wind the rope on the drum and to raise the hoist and platform. The hoist is provided with a latching mechanism including plungers which extend from the ends of the handles, each plunger having a pawl at its outer end. When a handle is rotated at a high speed as the platform drops, the pawl is projected outwardly engaging a plate extending from the frame of the hoist to stop rotation of the drum.

5 Claims, 7 Drawing Figures

PORTABLE ELEVATED STATION

BACKGROUND OF THE INVENTION

This invention relates to the art of providing elevated stations for hunters, bird watchers and the like, and has particular relationship to portable facilities enabling the hunter or bird watcher to set the station at a site, at an elevation and in a position which he regards as most suitable to serve his purposes. Sirls' U.S. Pat. No. 3,731,762 is typical of the prior art. Such prior-art apparatus includes a chair connected to a hoist having handles which the hunter operates to raise the chair. One disadvantage of Sirls is that it is difficult to operate when it is necessary to push the handles upwardly or horizontally through their highest and lowest positions. Another disadvantage of Sirls is that the hoist includes a ratchet mechanism for latching the chair in any position. To lower the chair, the hunter releases the dog of the ratchet and lowers himself on the chair. To hold the dog in released position while lowering oneself is a difficult and awkward task. In addition, the hunter could inadvertently release the handles of the hoist, or have them slip from his hands, and fall and injure himself.

It is an object of this invention to overcome the above-described disadvantages, and to provide portable apparatus for establishing an elevated station which shall be readily raised to any desired elevation by the operator, and readily lowered from this elevation and which during raising and lowering shall automatically secure the operator against falling. It is another object of this invention to provide such apparatus having facilities for securely holding the platform in any position to which it is raised. It is also an object of this invention to provide a hoist which, while uniquely suitable for portable apparatus for providing an elevated hunter's or bird watcher's station, has other purposes.

SUMMARY OF THE INVENTION

This invention arises from the realization that the difficulty encountered in the use of prior-art apparatus arises from the necessity, at times, of pushing or pulling horizontally or upwardly on the handles of the hoist. With the operator of the hoist sitting, for example, on the hunter's chair in Sirls' or on a platform, manipulations of the handles of the hoist horizontally or upwardly demands that the operator exert sufficient force to overcome his own weight plus the friction developed in the bearings and other parts of the hoist. This is usually a difficult task frequently demanding the strength of a weight lifter. In addition, it is difficult and awkward to push upwardly or horizontally on handles. It has been discovered that when the handles are manipulated downwardly the handles are readily operated and the force which need be exerted to raise the chair or platform is not excessively high.

In accordance with this invention, the hoist is provided with handles which, in all positions and elevations of the hoist and its load, enable the operator to pull downwardly in raising or lowering himself on the platform connected to the hoist. The hoist, with which the platform or chair is raised, includes a drum which is mounted on bearings. A flexible linear member, typically a rope or cable, is connected to the drum to be wound on the drum to raise the load, or to be unwound from the drum to lower the load, as the drum is rotated in one direction or the opposite direction. To rotate the drum, handles are provided attached to the drum cylinder. The drum conveniently extends beyond its bearing supports. Rods respectively secured intermediate their ends to each drum cylinder extension provide four such handles. With the rods at an angle to each other, for example at 90 degrees, a handle for pulling downwardly is available in all positions and elevations of the hoist and load. A hoist with three handles spaced, for example 120 degrees, also avails this facility.

In accordance with a further aspect of this invention, at least one handle is hollow along at least part of its length and is provided with a plunger carrying a pawl at its outer end. The plunger is retracted into the handle by gravity when the handle points upwardly, or by a spring, if one is provided, so that the pawl normally abuts the end of the handle. If the drum is rotated at a substantial speed, as it would be if the handles were released permitting the drum to rotate freely, the pawl is projected outwardly of the handle by the centrifugal force developed by the rotation. The hoist includes a plate which is in the path of a pawl when the pawl is projected out of the handle, but is cleared by the pawl when the pawl is retracted against the handle. The engagement of the pawl and the plate stops the rotation of the drum and the fall of the load on the hoist.

BRIEF DESCRIPTION OF THE DRAWINGS

For a better understanding of this invention, both as to its organization and as to its method of operation, together with additional objects and advantages thereof, reference is made to the following description taken in connection with the accompanying drawings; in which.

DETAILED DESCRIPTION OF EMBODIMENT

Figure 1:
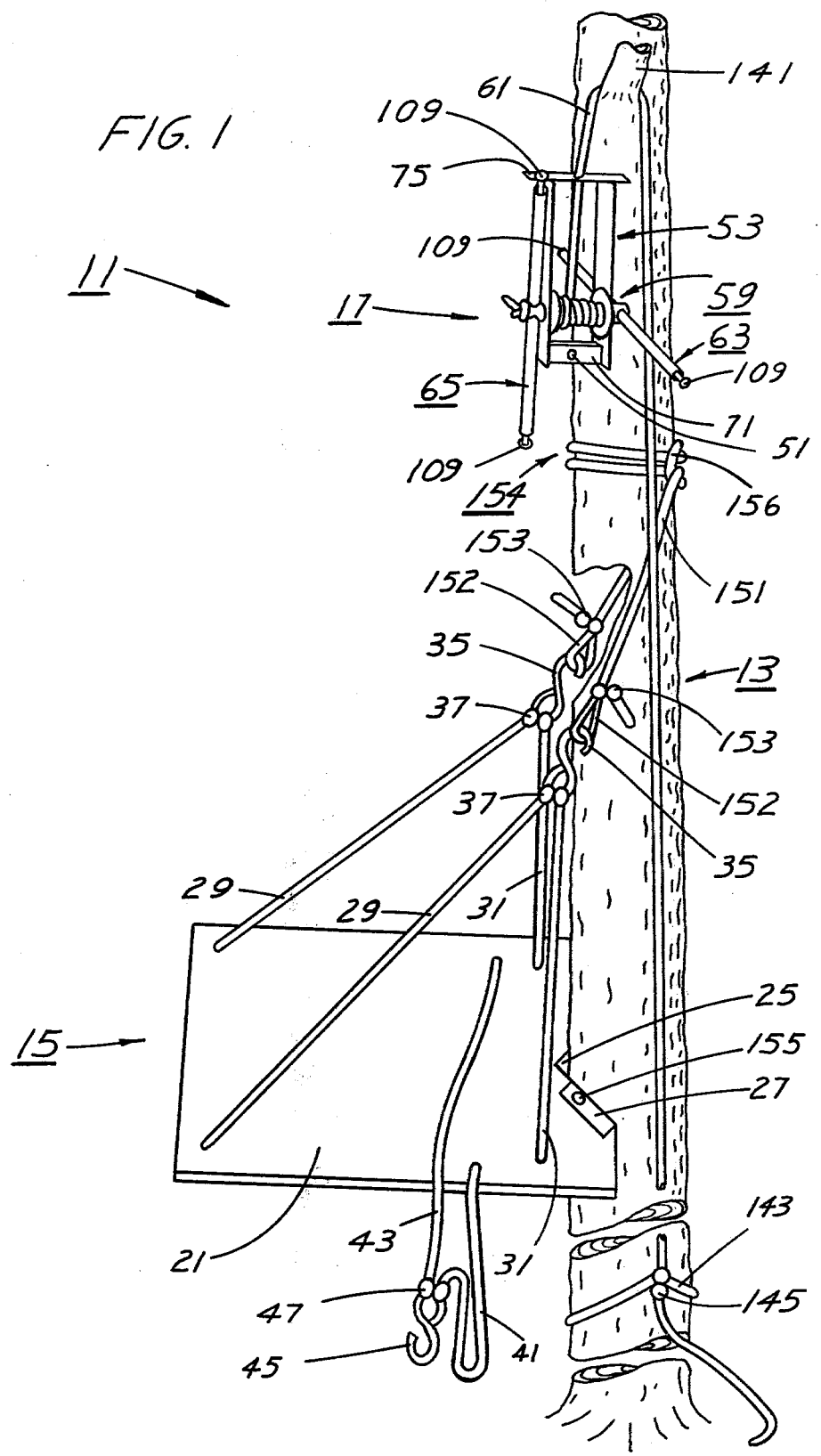
FIG. 1 is a view in perspective showing portable apparatus for providing an elevated station in accordance with this invention.

The apparatus shown in FIG. 1 is portable apparatus 11 for providing an elevated station on a tree 13. This apparatus includes a platform 15 and a hoist 17.

The platform 15 includes a board 21 of wood, plastic or the like of sufficient size to accommodate a hunter or bird watcher with his equipment including a foldable stool 23 (FIG. 6) on which the hunter or bird watcher may sit. The board 21 has in one end a notch 25 along whose sides the trunk of the tree 13 is engaged. On each side of the notch 25 there is a scrub bar 27. The trunk of the tree 13 is engaged by the scrub bars 27. Each scrub bar 27 is provided with a plurality of protuberances (not shown) where it engages the trunk. These protuberances prevent the board 21 from sliding around the tree trunk when the person on the board shifts his weight or position.

Figure 5:
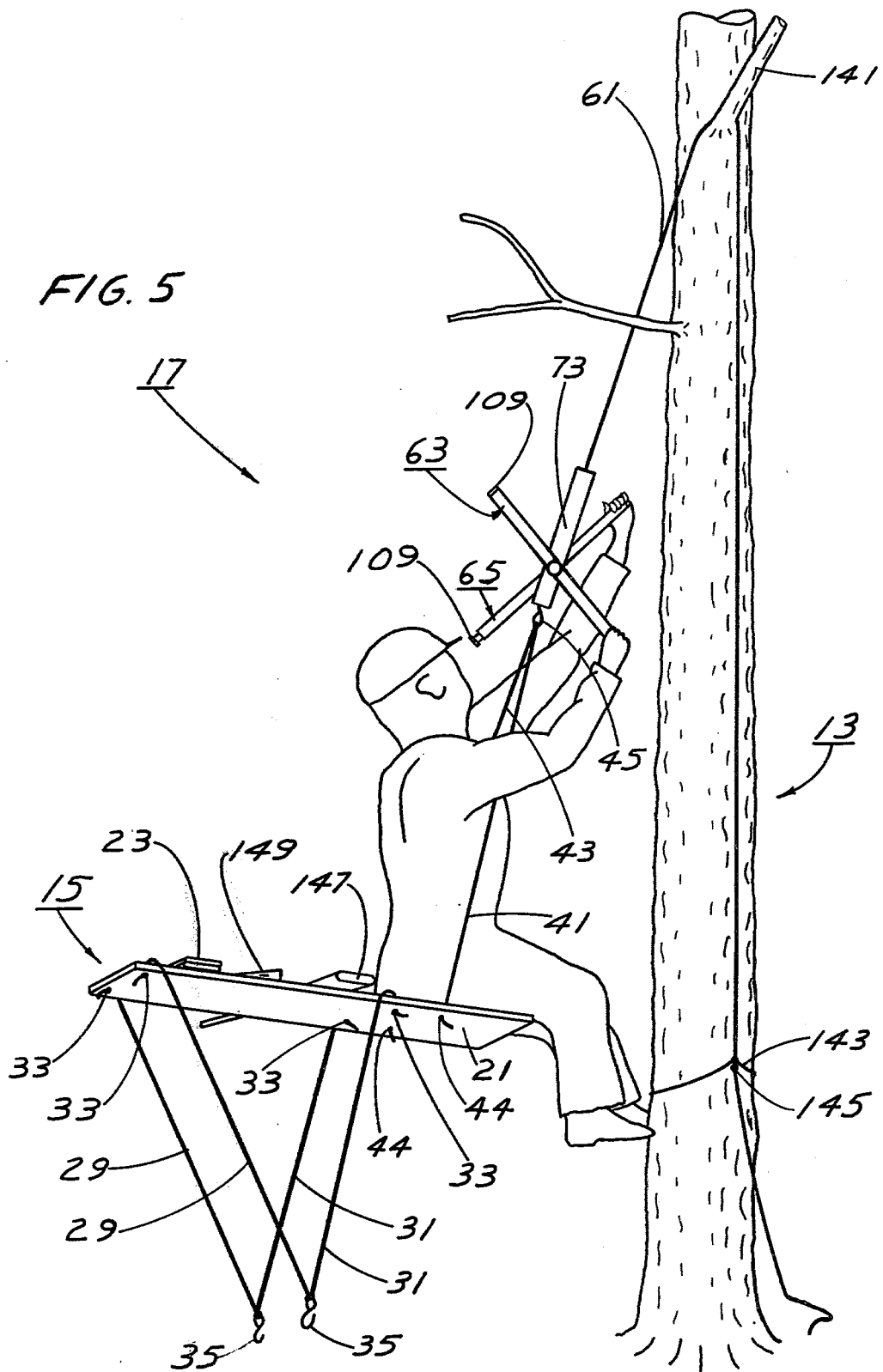
FIG. 5 is a view in perspective showing the manner in which the apparatus in FIG. 1 is operated.

The board 21 has holes near its corners. A hanger rope having a longer strand 29 and a shorter strand 31 is threaded through the holes on each side of the notch 25. The longer strands 29 extend from the holes remote from the notch and the shorter strands 31 extend from the holes near the notch 25. Each strand 29 or 31 can be pulled through the holes but they are secured against being pulled out of the holes by knots 33 (FIG. 5). A hanger hook 35 is secured by a knot 37 between each short strand 31 and the corresponding long strand 29. The board 21 also includes holes near its sides which are intermediate the holes through which the hanger rope strands 29 and 31 are threaded. A swing rope having strands 41 and 43 of substantially equal lengths are threaded through these holes and secured against being pulled out by knots 44 (FIG. 5). A swing hook 45 is secured by a knot 47 between these strands 41 and 43. In the operation of the apparatus, the swing hook 45 is hooked into a hole 51 (FIG. 2) in the bottom of the frame 53 of the hoist 17.

The hoist 17 (FIG. 2) includes, in addition to the frame 53, a drum 59, a linear flexible member 61, such as a rope or cable, and bars 63 and 65 which serve as handles for rotating the drum 59. The frame 53 is of generally U-shape having a cross member 71 from which legs 73 extend. At the end remote from the cross member 71, each leg 73 is welded to a cross member 74. The cross member 74 extends outwardly generally at right angles beyond each leg 73 forming plate-like opposite projections or feet 75 generally parallel to the cross member 71. A hole 77 is provided in cross member 74. The wall of hole 77 is a positioner for the flexible member 61. Above the cross member 71, the legs 73 have holes, the walls of which serve as bearings 76 for the drum 59.

Figure 6:
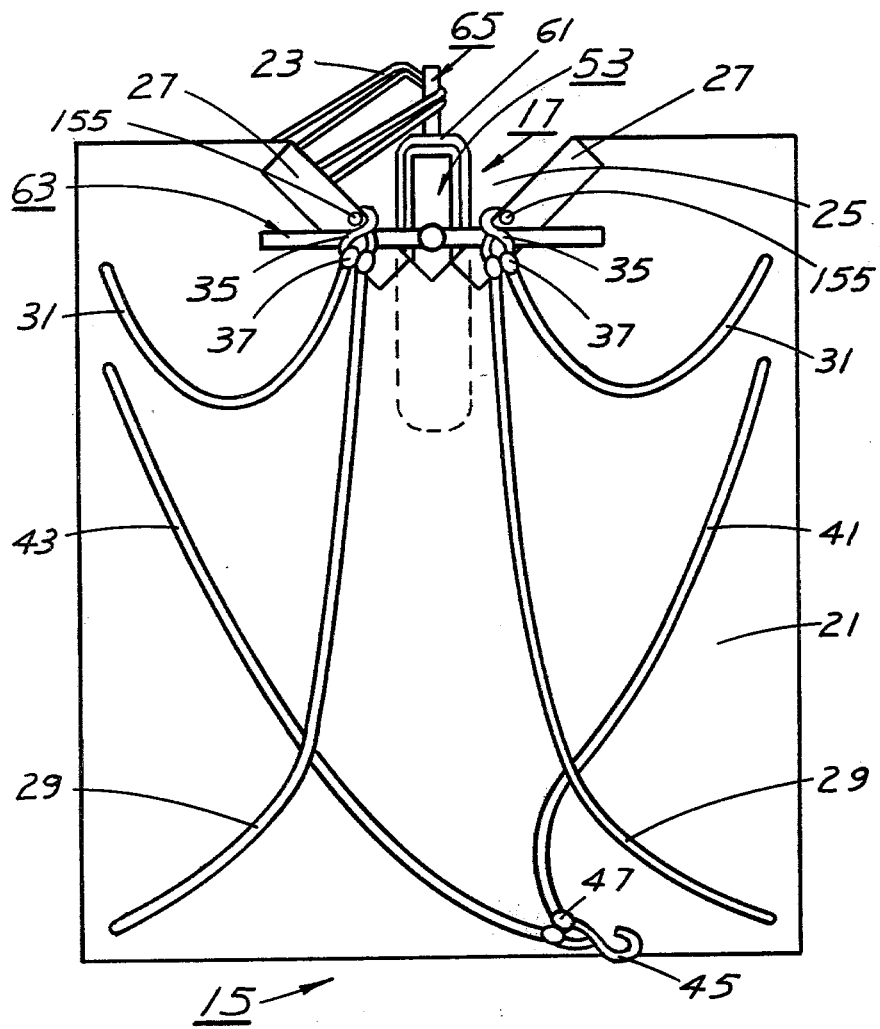
FIG. 6 is a plan view of the apparatus shown in FIG. 1 as it is assembled to be carried by the user.
Figure 3:
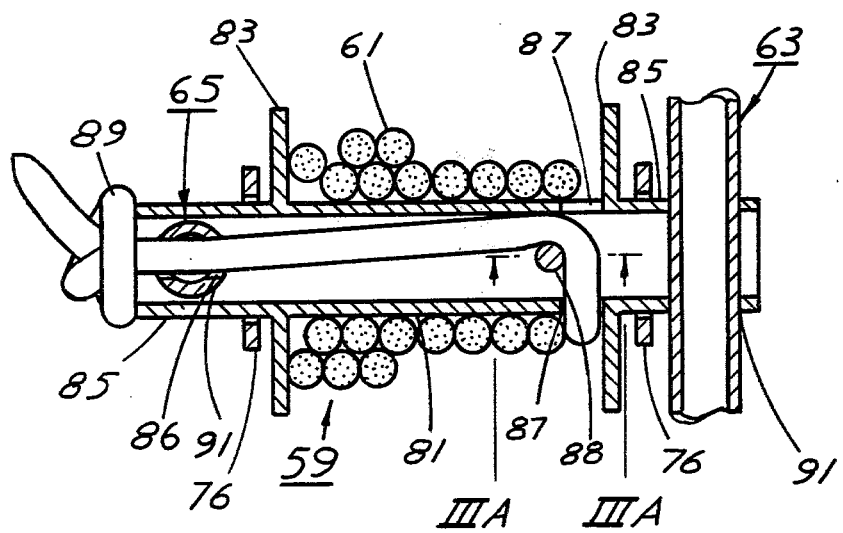
FIG. 3 is a view in section taken along line III—III of FIG. 2.
Figure 3A:
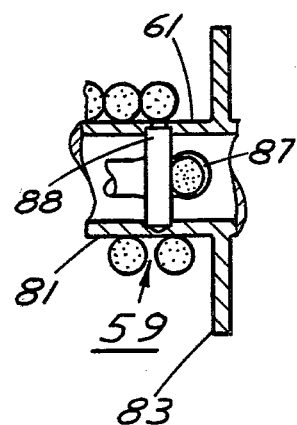
FIG. 3A is a fragmental view in section taken along line IIIA—IIIA of FIG. 3.

The drum 59 (FIG. 3) is a hollow cylinder 81 having flanges 83. The cylinder extends beyond the flanges 83 forming extensions 85 which serve as stub shafts rotatable in the bearings 76. The drum 59 has holes 87 adjacent one flange 83. The drum 59 also has a pin 88 (FIG. 3A) adjacent the holes 87. The flexible member 61 is secured by a knot 89 which engages the end of one extension 85, passes through a hole 86 (FIG. 3) in the rod 65, through the inside of the drum 59, takes about one quarter turn around pin 88, and passes through one of the holes 87 and is wound on the outer surface of the drum. The edge of pin 88, aligned with the inner edge of hole 87, is flush with, or overlaps slightly, this inner edge. The flexible member 61 is thus prevented from being frayed by the edge of hole 87. The end of the flexible member 61 from the last turn on the drum passes between the legs 73 and through the hole 77 in cross member 74. When not in use, the part of the flexible member 61 extending from the hole 77 may be wound about the frame 53 as shown in FIG. 6. Beyond the bearings 76 the extensions or stub shafts 85 have holes 91 through which the bars 63 and 65 extend. The bars 63 and 65 are supported centrally in the holes and each is secured by welds 93 to the stub shafts 85. The bars 63 and 65 are mounted at right angles to each other.

Figure 2:
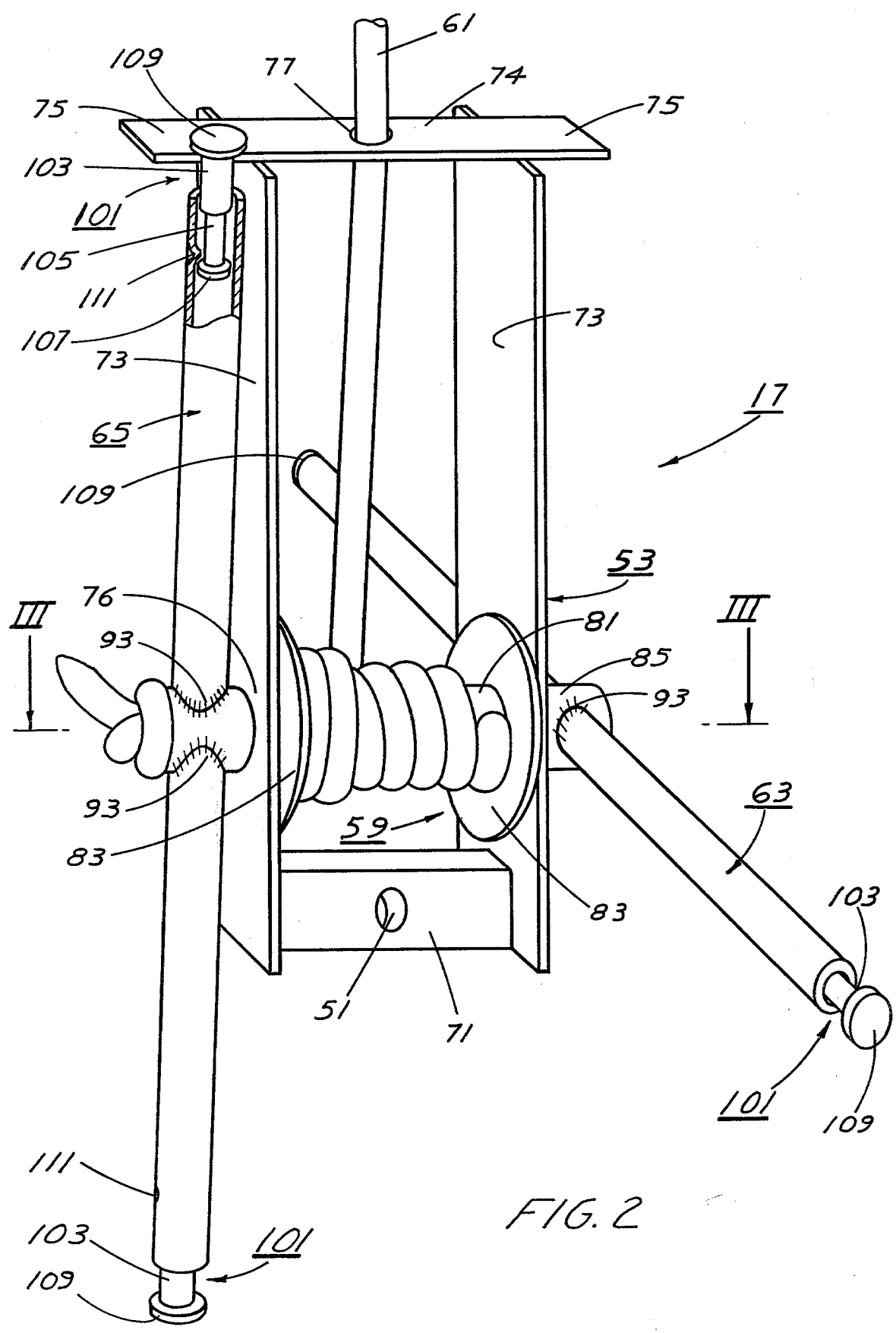
FIG. 2 is a view in perspective showing a hoist, in accordance with this invention, included in the apparatus shown in FIG. 1.

Each bar 63, or 65 is hollow and has in each end a plunger 101 (FIG. 2). The plunger 101 is cylindrical having a central portion 103 which has a reduced size stem 105 at the inner end; the stem 105 terminates in a flange 107. At its outer end the plunger has a disc 109 which serves as a pawl. Each plunger 101 is slideable in the end of the rod 63 or 65 in which it is inserted. Once the plunger 101 is inserted in an end, detents 111 are provided to prevent the plunger 101 from falling out. The detents 111 are sufficiently above the flange 107 to enable the plunger to project the pawl 109 appropriately outwardly.

Figure 4:
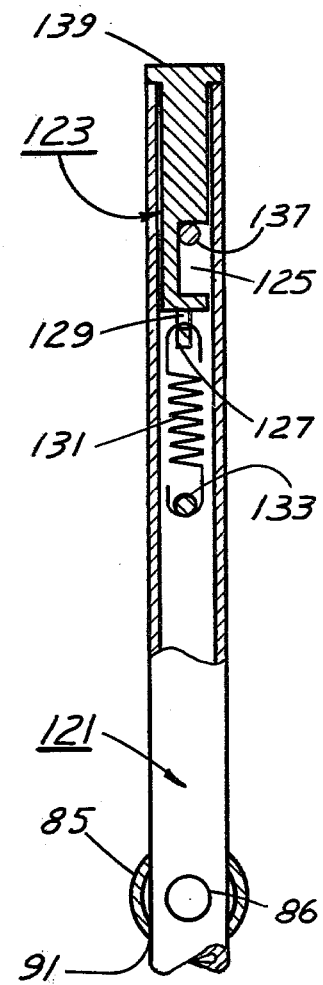
FIG. 4 is a view in longitudinal section of a handle for a hoist, in accordance with a modification of this invention, in which the pawl is retracted in all positions of the handle by a spring, rather than by gravity in the upward position of the handle only.

An alternative structure including a rod 121 is shown in FIG. 4. In this case the plunger 123 has a groove 125 near its inner end and a projection 127 having a hole 129. The plunger 123 is urged inwardly by a spring 131. The spring 131 is secured to a pin 133 which extends through the rod 121 at its inner end and engages the hole 129 at its outer end. Another pin 137 limits the movement of the plunger outwardly by abutting the inner boundary of the groove 125.

The rods 63 and 65 or 121 are of such length and are so mounted on the extensions or stub shafts 85 that the pawls 109 or 139, when retracted, clear the feet 75 of the frame 53 and can pass under them.

Preparatory to raising the platform 15, the hoist is held with the legs 73 generally vertically upwardly and the feet 75 generally horizontal so that, when the end of a rod is in the vicinity of a foot 75, the corresponding plunger 101 is held retracted by gravity with the rod moving at a low speed as it would move when the hoist is raising the platform 15. Likewise the pawl 139 is held retracted by spring 131. The plunger at the end of one of the rods 63, 65 or 121 may be pulled out and the pawl 109 or 139 engaged with the edge of a foot 75 to hold the platform 15 in a desired position. In the event that a rod 63, 65 or 121 is inadvertently released so that the platform would tend to fall, the rods 63 and 65 or 121 are rotated at a higher velocity so that a pawl 109 or 139 promptly engages a foot 75 and prevents the platform 15 from falling.

In the use of the apparatus disclosed, the user is provided with a string to whose end a stone or a weight is secured. The user throws or, with a sling shot, shoots the stone or weight over the bough 141 (FIG. 1) of a tree 13. The string is of such length that its end opposite to the stone or weight extends over the bough accessible to the user. The user then ties the end of the flexible linear member 61 to the string and with the string pulls member 61 over the bough 141 and to the base of the tree 13. The hoist 17 is on the opposite side of bough 141 from the end of the flexible member 61. The user then unties the string and securely ties the member 61 near the base of the tree 13. As shown in FIGS. 1 and 5, a loop 143 secured by knot 145 is preferred. The user then hooks swing hook 45 into hole 51 thereby attaching the platform 15 to the hoist 17, seats himself on the platform 15 as shown in FIG. 5 and places his equipment, typically a gun 147, a hatchet 149 to chop away small limbs, ropes, and a stool 23 and other facilities on the platform 15. He then operates those handles of the rods 63 or 65 or 121 which permit him to pull downwardly raising the platform 15 to a desired position. When the platform reaches the desired position, the user pulls out the available plunger 107 or 123, for example the upper plunger in rod 65 as shown in FIG. 1, and engages the pawl 109 or 139 with the adjacent foot 75. The user then ties a rope 151 having loops 152 near its ends secured by knots 153 to the tree in a position between the hoist 17 and the platform 15 and the hooks the hanger hooks 35 into the loops 152. The rope 151 is tied in a cow-hitch knot 154 with the loop 156 on the opposite side of the tree from the platform 15. Secured in this way, the platform is stable and returns to its stable position when the person on the platform 15 abruptly moves from one position to another. The scrub bars 27 suppress rotation of the platform 15 about the tree by reason of sudden abrupt movement. The user next pulls down on the handle of rod 63 allowing the pawl 109 of rod 65, which is assumed to be engaged with foot 75, to move downwardly out of engagement with the adjacent foot 75. He then allows the handle of rod 63 to move upwardly while pulling downwardly appropriately to restrict the upward speed of that handle. He continues in this way to allow those handles of rods 63 and 65, which permit him to pull downwardly, to move upwardly thereby lowering the platform 15 until hanger rope strands 29 and 31 and the rope 151 are taut and carry the weight of platform 15. The platform is now positioned for use.

The apparatus may be transported assembled as shown in FIG. 6. The flexible member 61 is wound about the frame 53 and secured at its end. The hoist 17 is then suspended by one of the rods 63 or 65 from the notch 25. The stool 23 is placed over the other rod 63 or 65. The hooks 35 are hooked in holes 155 through the scrub bar 27 and the board 21. The user carries the apparatus 11 on his back pulling his arms through the strands 29 so that the strands extend over his shoulders.

While preferred embodiments of this invention have been disclosed herein, many modifications thereof are feasible. This invention is not to be restricted except insofar as is necessitated by the spirit of the prior art.

I claim:

1. Portable apparatus for providing an elevated station, for a hunter, bird watcher or the like, on a tree or the like, including a platform, and a hoist, said hoist including:
   (a) a drum,
   (b) means for mounting said drum rotatably,
   (c) a flexible linear member to be secured to said tree near one end of said member and to extend over a projection of said tree above said hoist and to engage said drum near the opposite end thereof so that rotation of said drum in one direction winds said flexible member on said drum raising said hoist and rotation of said drum in the opposite direction unwinds said flexible member from said drum lowering said hoist, and
   (d) at least one handle connected to said drum for rotating said drum, said handle extending transversely to the rotational axis of said drum,
   (e) a pawl extending from the end of said one handle said pawl being retracted within said handle in the static or low-angular velocity state of said handle and permitting said pawl to be projected radially outwardly from said handle by centrifugal force on the rotation of said drum and said handle at a higher angular velocity, and
   (f) a member extending from said hoist to a position adjacent to the path of said end of said one handle as said one handle is rotated, said member clearing said pawl on rotation of said one handle at said low angular velocity when said pawl remains retracted and being engaged by said pawl to stop said drum on rotation of said one handle at an angular velocity producing sufficient centrifugal force to project said pawl.

2. The apparatus of claim 2 wherein the plate is above the drum and the linear flexible member extends upwardly through the plate so that when the pawl engages the plate, the flexible member snubs the plate and prevents its rotation under the force exerted by the one handle through the pawl.

3. A hoist including a drum, means mounting said drum for rotation, said mounting means including means, to be engaged, for rotating said drum, a flexible linear member connected to said drum to be wound on said drum on rotation of said drum in one direction and to be unwound from said drum on rotation of said drum in the opposite direction, said rotating means including a plurality of handles connected to said drum for rotating said drum, said handles extending transversely from said rotating means, a pawl extending from an end of at least one of said handles, means within said handle engaging said pawl to maintain said pawl retracted within said end in the static or low-angular velocity state of said handle and permitting said pawl to be projected outwardly of said end on rotation of said handle at a higher angular velocity, and a plate, connected to said mounting means, positioned to be cleared by said pawl when said pawl is retracted and to be engaged by said pawl to stop rotation of said drum when said pawl is projected outwardly.

4. The hoist of claim 4 wherein the mounting means includes a frame having bearings for the drum near one end thereof, the plate extending from the other end of said bracket.

5. The hoist of claim 4 wherein a pawl extends from the end of each of the handles.

* * * * *